United States Patent
Sakashita et al.

(10) Patent No.: US 11,279,417 B2
(45) Date of Patent: Mar. 22, 2022

(54) VEHICLE UNDERBODY STRUCTURE

(71) Applicant: MAZDA MOTOR CORPORATION, Hiroshima (JP)

(72) Inventors: Hironobu Sakashita, Hiroshima (JP); Masaru Chikita, Hiroshima (JP); Kazuhiro Kageyama, Hiroshima (JP); Kohei Miyamoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 211 days.

(21) Appl. No.: 16/649,409

(22) PCT Filed: Aug. 21, 2018

(86) PCT No.: PCT/JP2018/030834
§ 371 (c)(1),
(2) Date: Mar. 20, 2020

(87) PCT Pub. No.: WO2019/064999
PCT Pub. Date: Apr. 4, 2019

(65) Prior Publication Data
US 2020/0298914 A1 Sep. 24, 2020

(30) Foreign Application Priority Data
Sep. 28, 2017 (JP) .............................. JP2017-188755

(51) Int. Cl.
*B60J 7/00* (2006.01)
*B62D 25/20* (2006.01)
(Continued)

(52) U.S. Cl.
CPC .......... *B62D 25/2036* (2013.01); *B60K 13/04* (2013.01); *B60K 2001/0438* (2013.01);
(Continued)

(58) Field of Classification Search
CPC ..... A61K 2300/00; A61K 45/06; A61P 43/00; A61P 35/00; H01L 2924/00;
(Continued)

(56) References Cited

U.S. PATENT DOCUMENTS 6,555,070 B1 4/2003 Kruger
2002/0185893 A1* 12/2002 Hashirayama .......... F01N 13/14
296/204

(Continued)

FOREIGN PATENT DOCUMENTS

EP 0992659 A2 4/2000
EP 3064732 A1 9/2016
(Continued)

OTHER PUBLICATIONS

The extended European search report issued by the European Patent Office dated Jun. 29, 2020, which corresponds to European Patent Application No. 18862695.6-1132 and is related to U.S. Appl. No. 16/649,409.
(Continued)

*Primary Examiner* — Kiran B Patel
(74) *Attorney, Agent, or Firm* — Studebaker & Brackett PC (57) ABSTRACT

A vehicle underbody structure includes a catalyst disposed in a front portion of an exhaust pipe; a cover member for covering the catalyst from above; and a heat insulator disposed inside a tunnel portion behind the catalyst and configured to cover the exhaust pipe from above. The heat insulator is disposed away from the tunnel portion by a predetermined gap in an up-down direction. A front portion of the heat insulator and a rear portion of the cover member are disposed in such a way as to overlap each other. A front end of the heat insulator is disposed on the upper side with respect to a rear end of the cover member.

7 Claims, 8 Drawing Sheets

(51) Int. Cl.
  *B60K 13/04* (2006.01)
  *B60K 1/04* (2019.01)
  *B62D 21/15* (2006.01)
  *F01N 13/18* (2010.01)
(52) U.S. Cl.
  CPC ........ *B62D 21/152* (2013.01); *B62D 25/2018* (2013.01); *F01N 13/1822* (2013.01); *F01N 2340/04* (2013.01)
(58) Field of Classification Search
  CPC .......... A61B 5/15003; A61B 5/150259; A61B 5/150274; A61B 5/150305
  See application file for complete search history.

(56) References Cited

U.S. PATENT DOCUMENTS

| | | | | |
|---|---|---|---|---|
| 2005/0193726 | A1* | 9/2005 | Funakoshi | F01N 3/08 60/323 |
| 2016/0258336 | A1 | 9/2016 | Tsuchiya et al. | |
| 2017/0260893 | A1* | 9/2017 | Kuramashi | F02D 17/02 |
| 2018/0022389 | A1* | 1/2018 | Kageyama | B62D 21/157 296/187.08 |
| 2019/0291524 | A1* | 9/2019 | Nishida | B62D 35/02 |
| 2019/0291789 | A1* | 9/2019 | Nishida | B62D 35/02 |
| 2020/0298914 | A1* | 9/2020 | Sakashita | B60R 13/0876 |

FOREIGN PATENT DOCUMENTS

| | | |
|---|---|---|
| JP | 2004-324474 A | 11/2004 |
| JP | 2005-248778 A | 9/2005 |
| JP | 2010-133607 A | 6/2010 |
| JP | 2010-143415 A | 7/2010 |
| JP | 2011-131689 A | 7/2011 |
| JP | 2013-006503 A | 1/2013 |

OTHER PUBLICATIONS

International Search Report issued in PCT/JP2018/030834; dated Oct. 2, 2018.

* cited by examiner

VEHICLE UNDERBODY STRUCTURE

TECHNICAL FIELD

The present invention relates to a vehicle underbody structure, and more particularly, to a vehicle underbody structure including a heat insulator below a floor surface of a vehicle body, and belongs to a technical field of a vehicle body structure of a vehicle such as automobiles.

BACKGROUND ART

Generally, in a vehicle in which an engine is installed in a front portion of a vehicle body, an exhaust pipe extending in a front-rear direction of the vehicle body is disposed within a tunnel portion formed on a floor surface of a passenger compartment. The exhaust pipe itself becomes a heat source by high-temperature exhaust gas flowing therein, and may cause harmful effects such as an increase in passenger compartment temperature, and heat damage to a component disposed around the exhaust pipe.

As a countermeasure against this problem, generally, a heat insulator is disposed around the exhaust pipe, as a heat insulating member or a heat shielding member. Patent Literature 1 discloses mounting a heat insulator in such a way as to cover an exhaust pipe disposed inside a tunnel portion on a floor surface of a passenger compartment from above. In the structure of Patent Literature 1, since radiant heat from the exhaust pipe is reflected on the ground by the heat insulator, transfer of radiant heat from the exhaust pipe to the inner side of the passenger compartment is suppressed.

This enables to suppress an increase in passenger compartment temperature, and heat damage to a component (hereinafter, referred to as a "non-heat-resistant component") such as an airbag control unit and a fuel tank, for example, which are disposed on the outer side of the heat insulator. A gap is formed between a middle portion of the heat insulator in a vehicle width direction and a passenger compartment floor surface such as the tunnel portion in such a way that heat from the exhaust pipe is not directly transferred to the inner side of the passenger compartment via the heat insulator.

Air flowing from a radiator grill on a vehicle front surface into an engine room during driving of a vehicle flows rearwardly of a vehicle body via a cooling device (such as a condenser and a radiator) disposed behind a bumper. The air flows along a catalyst disposed in the vicinity of a rear wall surface of an engine, and cools the catalyst (receives heat from the catalyst), whereby the air is brought to a high temperature state, and introduced to a tunnel portion behind the engine room.

Further, the air in a high temperature state by flowing along the catalyst as described above is introduced to the gap between the heat insulator located behind the catalyst and the passenger compartment floor surface. However, the high-temperature air introduced to the gap may flow along the passenger compartment floor surface, and cause harmful effects such as an increase in passenger compartment temperature, and heat damage to a non-heat-resistant component disposed inside the passenger compartment.

In order to solve such problems, it is proposed to dispose a heat insulating member and the like in a gap between a passenger compartment floor surface and a heat insulator. This, however, may increase the cost and the weight of a vehicle.

CITATION LIST

Patent Literature

Patent Literature 1: Japanese Unexamined Patent Application Publication No. 2010-143415

SUMMARY OF INVENTION

In view of the above, an object of the present invention is to provide a vehicle underbody structure including a heat insulator disposed along an inner surface of a tunnel portion on a passenger compartment floor surface, wherein heat damage to a non-heat-resistant component disposed on the passenger compartment floor surface is suppressed by suppressing heat transfer to the passenger compartment floor surface from air, which is heated to a high temperature by flowing along a catalyst, without increasing the cost and the weight of a vehicle.

In order to achieve the above object, a vehicle underbody structure according to the present invention includes a catalyst disposed in a front portion of an exhaust pipe; a cover member for covering the catalyst from above; and a heat insulator disposed inside a tunnel portion extending in a front-rear direction of a vehicle body at a position behind the catalyst, the heat insulator extending along the tunnel portion and configured to cover the exhaust pipe from above. The heat insulator is disposed away from the tunnel portion by a predetermined gap in an up-down direction. A front portion of the heat insulator and a rear portion of the cover member are disposed in such a way as to overlap each other. A front end of the heat insulator is disposed on an upper side with respect to a rear end of the cover member.

DESCRIPTION OF EMBODIMENTS

In the following, details of a vehicle underbody structure of a vehicle according to an embodiment of the present invention are described.

Figure 1:
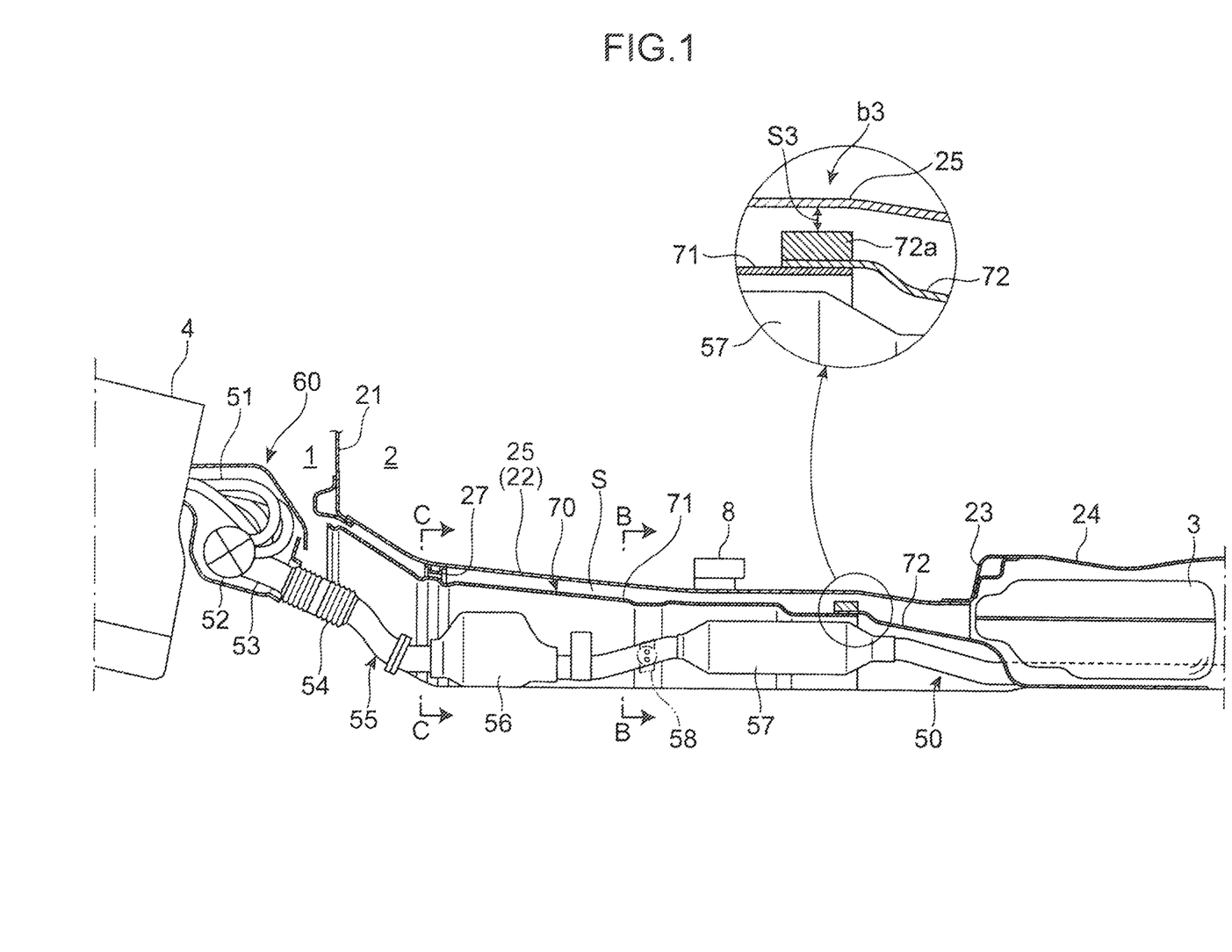
FIG. 1 is a cross-sectional view illustrating a vehicle underbody of a vehicle according to an embodiment of the present invention.

As illustrated in FIG. 1, a vehicle according to the present embodiment includes, in a vehicle underbody thereof, a dashboard panel 21 for separating an engine room 1 and a passenger compartment 2 behind the engine room 1, a front floor panel 22 extending from a lower end of the dashboard panel 21 rearwardly of a vehicle body and defining a passenger compartment floor surface, a kick-up portion 23 rising upwardly from a rear end of the front floor panel 22, and a rear floor panel 24 extending rearwardly from an upper end of the kick-up portion 23. A fuel tank 3 is disposed behind the kick-up portion 23 and below the rear floor panel 24.

Figure 7:
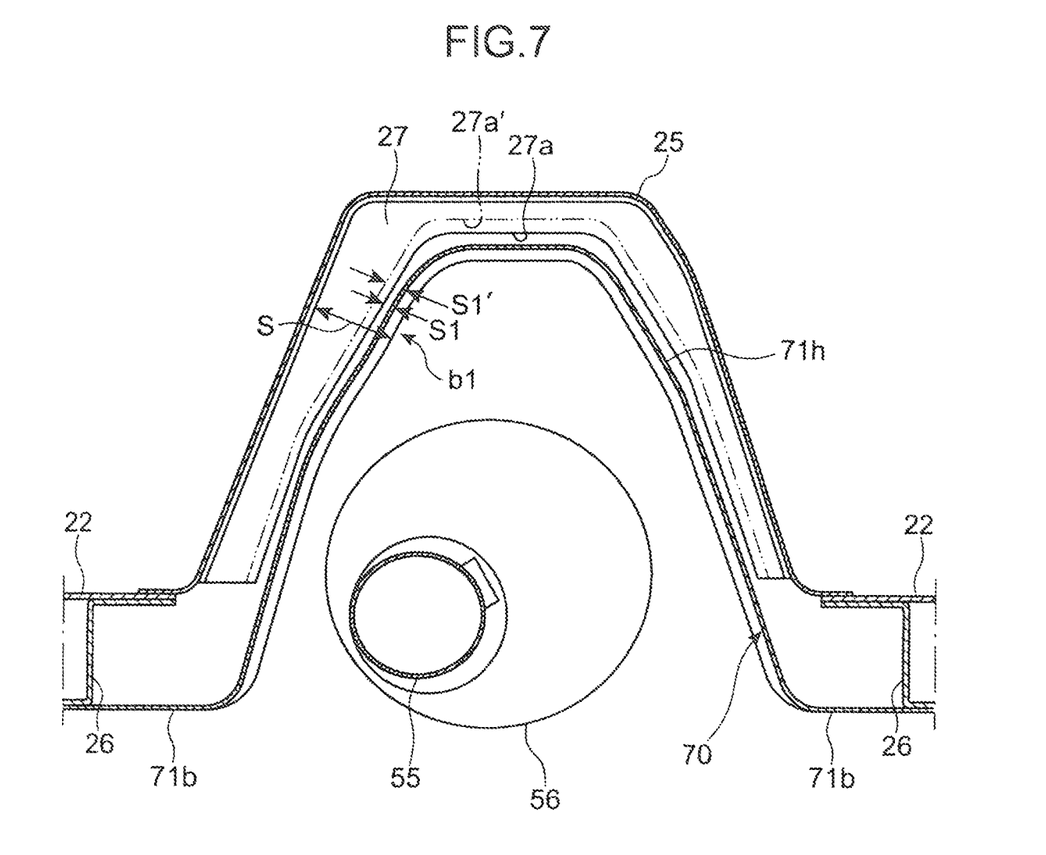
FIG. 7 is a cross-sectional view taken along the line C-C in FIG. 1.

A tunnel portion 25 opened downwardly and projecting upwardly in an inverted U-shape in cross section is formed on a middle portion of the front floor panel 22 in a vehicle width direction in such a way as to extend in a front-rear direction of the vehicle body. Further, as illustrated in FIG. 7, a pair of tunnel frames 26 and 26 extending in the front-rear direction of the vehicle body are formed on lower edges of both sides of the tunnel portion 25. A tunnel reinforcement member 27 of a hat-shape in cross section is formed on an inner peripheral surface of a front portion of the tunnel portion 25 along the shape of an inner surface of the tunnel portion 25 (in such a way as to span a heat insulator 70 to be described later).

As illustrated in FIG. 1, an engine 4 is disposed in the engine room 1. An exhaust passage is connected to a rear wall surface of the engine 4. The exhaust passage includes an exhaust manifold 51, a front exhaust pipe 53 as a collecting pipes formed by collecting branch pipes of the exhaust manifold 51, a direct catalyst 52 provided between the exhaust manifold 51 and the front exhaust pipe 53 (directly connected to the exhaust manifold 51), a flexible tube 54 connected to a rear end of the front exhaust pipe 53, and an exhaust pipe 50 connected to a rear end of the flexible tube 54. In other words, the exhaust pipe 50 is connected to the rear wall surface of the engine 4 via the exhaust manifold 51, the direct catalyst 52, the front exhaust pipe 53, and the flexible tube 54.

The exhaust pipe 50 is introduced into the tunnel portion 25. Specifically, the exhaust pipe 50 is disposed in such a way as to extend in the front-rear direction of the vehicle body below the front floor panel 22 and the rear floor panel 24 along the tunnel portion 25. The exhaust manifold 51 and the direct catalyst 52 are covered from above and below by a cover member 60. The direct catalyst 52 corresponds to one example of "a catalyst" in the present invention.

The exhaust pipe 50 includes an exhaust pipe body 55 extending rearwardly from the flexible tube 54, and a floor catalyst 56 and a pre-silencer 57 each provided at a midway of the exhaust pipe body 55. The floor catalyst 56 is a component, which has a larger diameter than the exhaust pipe body 55, and is heated to a higher temperature than the exhaust pipe body 55. An unillustrated main silencer and an unillustrated tail pipe are provided further behind the pre-silencer 57.

Figure 6:
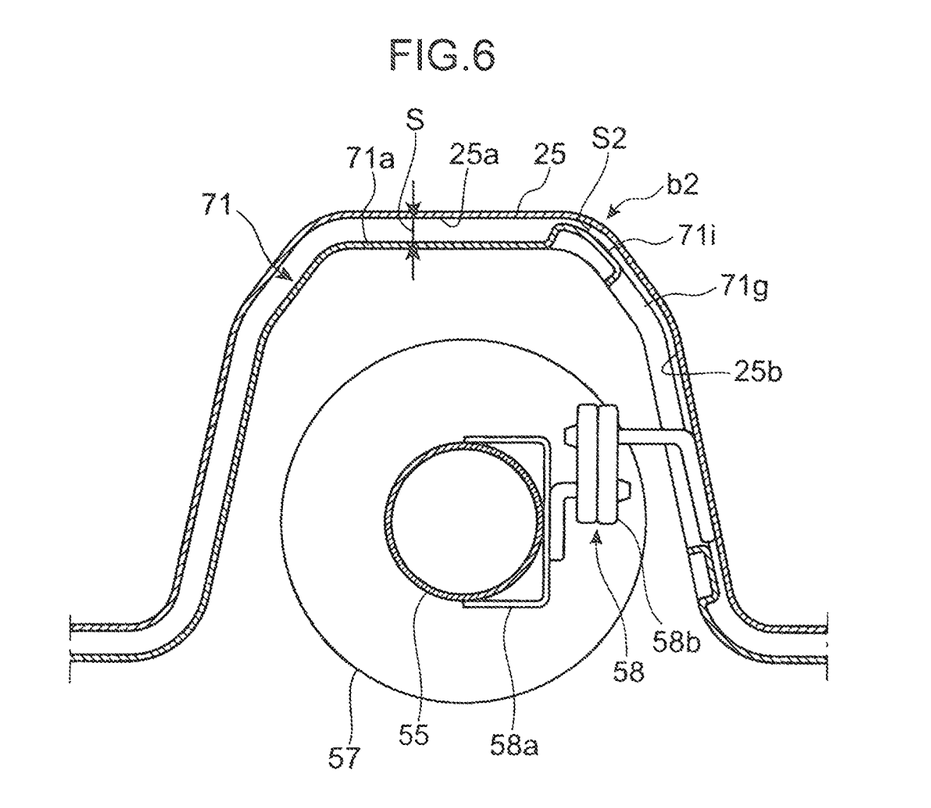
FIG. 6 is a cross-sectional view taken along the line B-B in FIG. 1.

The exhaust pipe body 55 is fixed to the tunnel portion 25 via a support member 58. Specifically, as illustrated in FIG. 6, a mounting bracket 58a is mounted on the exhaust pipe body 55 between the floor catalyst 56 and the pre-silencer 57. A hanger rubber member 58b made of rubber is mounted on the mounting bracket 58a. The exhaust pipe body 55 is elastically supported to an inner side wall of the tunnel portion 25 via the hanger rubber member 58b.

As illustrated in FIGS. 1, 6, and 7, the heat insulator 70 projecting upwardly, opened downwardly, and having an inverted U-shape in cross section is provided inside the tunnel portion 25 in such a way as to extend in the front-rear direction of the vehicle body. As illustrated in FIG. 1, an upper surface of the heat insulator 70 is formed in such a way as to incline upwardly and forwardly along the shape of the dashboard panel 21 and the tunnel portion 25. The heat insulator 70 has a divided structure in which the heat insulator 70 is divided into a front part and a rear part, and includes a front heat insulator 71 located on the front side of the vehicle body, and a rear heat insulator 72 located on the rear side of the vehicle body.

The front heat insulator 71 is disposed in such a way as to cover the exhaust pipe body 55, the floor catalyst 56, and the pre-silencer 57 from above. On the other hand, the rear heat insulator 72 is connected to a rear end of the front heat insulator 71 in such a way as to overlap the rear end at a position above a rear portion of the pre-silencer 57. A rear portion of the rear heat insulator 72 extends in such a way as to cover the fuel tank 3 from below.

As illustrated in FIG. 7, the heat insulator 70 is mounted below the tunnel portion 25 by fixing lower edges (flange portions 71b to be described later) of both sides of the heat insulator 70 to the tunnel frames 26 and 26. In the mounted state, the heat insulator 70 is disposed away from and below the tunnel portion 25 by a predetermined gap. Specifically, a gap S is formed between the tunnel portion 25 and the heat insulator 70. Thus, direct transfer of heat of the exhaust pipe body 55, the floor catalyst 56, and the like inside the tunnel portion 25 into the interior of the passenger compartment 2 is prevented.

The vehicle includes an airbag module (not illustrated), and an airbag control unit 8 for controlling deployment of the airbag module. The airbag control unit 8 is disposed on a surface of the tunnel portion 25 on the vehicle interior side (specifically, an upper surface of a middle portion of the tunnel portion 25 in the vehicle width direction), which is less likely to collapse at collision or the like. The airbag control unit 8 is a non-heat-resistant component, which requires measures against heat damage by air, which is heated to a high temperature by flowing along the direct catalyst 52, and heat from the exhaust pipe body 55, the floor catalyst 56, and the like inside the tunnel portion 25.

Figure 2:
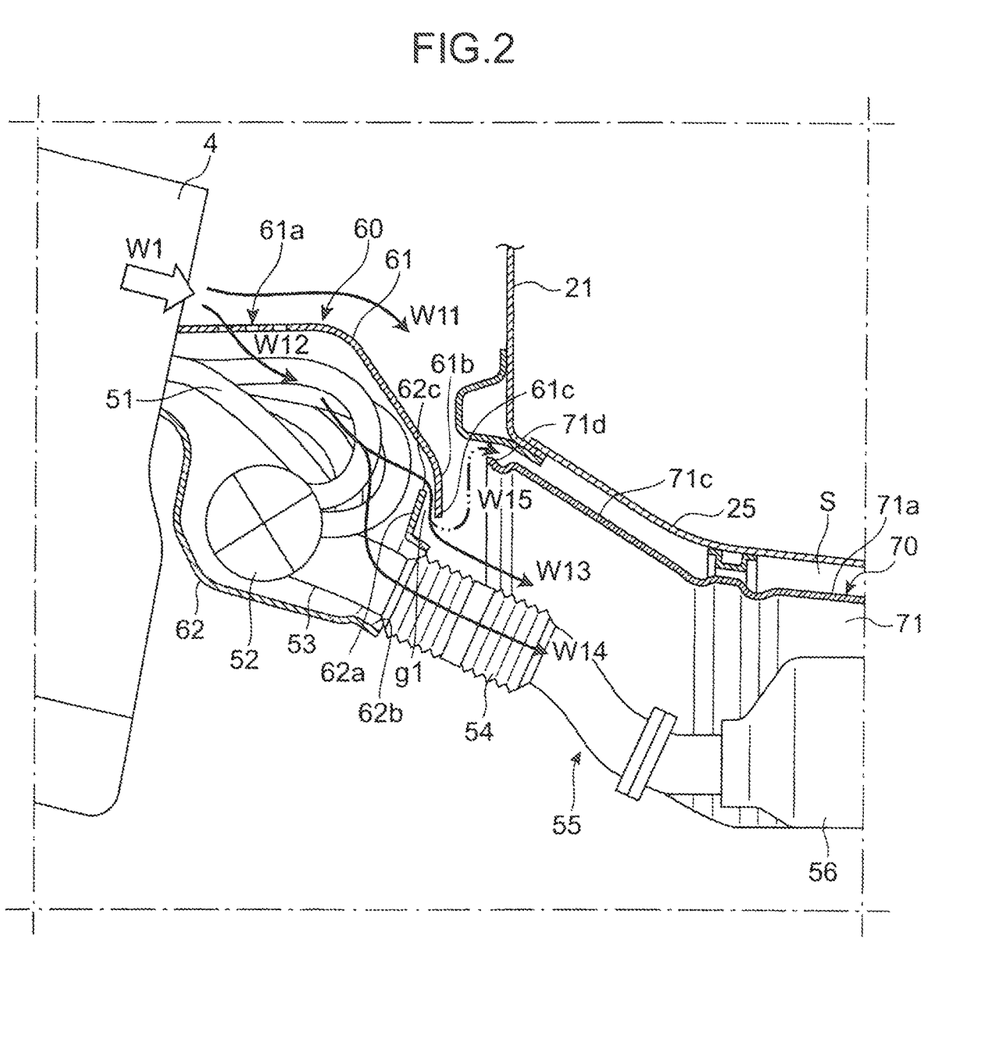
FIG. 2 is an enlarged cross-sectional view of FIG. 1.
Figure 5:
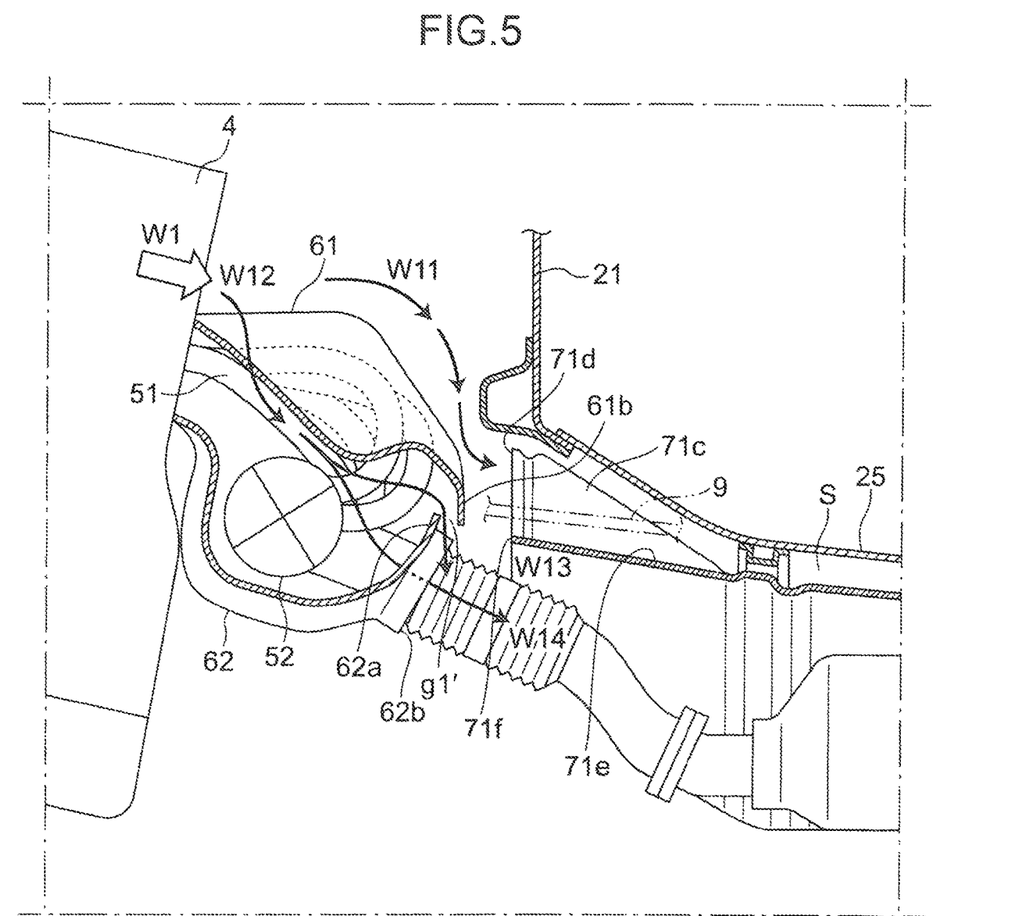
FIG. 5 is a cross-sectional view taken along the line A-A in FIG. 4.

As illustrated in FIGS. 2 and 5, the cover member 60 includes an upper cover 61 for covering the exhaust manifold 51 and the direct catalyst 52 from above, and a lower cover 62 for covering the exhaust manifold 51 and the direct catalyst 52 from below.

A slit 61a is formed in an upper surface of the upper cover 61. The slit 61a plays a role of introducing, into the cover member 60, a part of air W1 flowing from the vehicle front side into the engine room 1, as cooling air W12 for cooling the direct catalyst 52 inside the cover member 60.

A rear portion 62a of the lower cover 62 includes, at a position associated with a connecting portion between the front exhaust pipe 53 and the flexible tube 54, an opening portion 62b for passing the front exhaust pipe 53 and the flexible tube 54.

The upper cover 61 includes a front portion being a portion where the slit 61a is formed, and a rear portion 61b extending rearwardly and downwardly from a rear end of the front portion. The rear portion 61b of the upper cover 61 includes a rear end 61c at a position on the rear side and on the lower side with respect to an upper edge 62c of the rear portion 62a of the lower cover 62. In other words, the rear portion 61b of the upper cover 61 is disposed in such a way as to cover a part of an upper portion of the rear portion 62a of the lower cover 62 from behind and from above.

Figure 3:
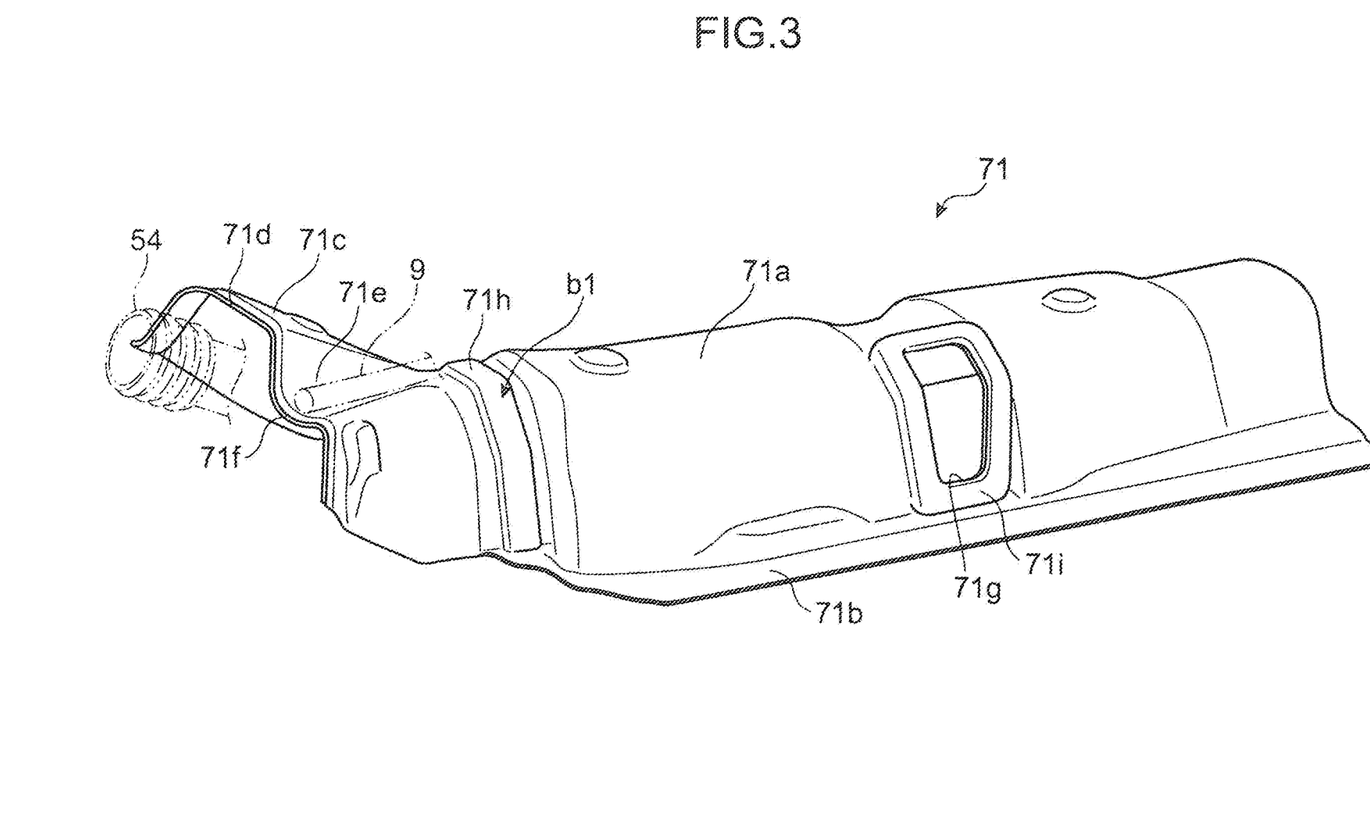
FIG. 3 is a perspective view illustrating a heat insulator.

The front heat insulator 71 is described in details with reference to FIG. 3. As illustrated in FIG. 3, the front heat insulator 71 according to the present embodiment is constituted of a metal plate member; and includes a body portion 71a of an inverted U-shape in cross section, and a pair of flange portions 71b and 71b extending from lower ends of both side walls of the body portion 71a outwardly in the vehicle width direction. The flange portions 71b and 71b are fixed to the tunnel frames 26 and 26 (see FIG. 7).

A rising portion 71c rising from a front end of the body portion 71a of the front heat insulator 71, while inclining upwardly and forwardly is formed on the front heat insulator 71 in such a way as to be associated with a lower portion of the dashboard panel 21. The rising portion 71c corresponds to "a front portion of a heat insulator" in the present invention.

As illustrated in FIG. 2, the rear portion 61b of the upper cover 61 of the cover member 70 and the rising portion 71c of the front heat insulator 71 are disposed in such a way as to overlap each other when viewed in the front-rear direction of the vehicle body. Specifically, a front end 71d of the rising portion 71c is disposed in such a way as to be located on the upper side with respect to the rear end 61c of the rear portion 61b of the upper cover 61, and to be proximate to the rear portion 61b of the upper cover 61 in the front-rear direction.

During driving of the vehicle, the air W1 flowing from a radiator grill on a vehicle front surface into the engine room flows rearwardly of the vehicle body via a cooling device (such as a condenser and a radiator) disposed behind a bumper. The air W1 is branched into air W11 flowing along an upper surface of the cover member 60 on the rear side of the engine 4, and the air W12 intruding into the cover member 60 through the slit 61a of the upper cover 61 of the cover member 60.

Since the air W11 flowing along the upper surface of the cover member 60 does not directly come into contact with the exhaust manifold 51 and the direct catalyst 52 inside the cover member 60, the air W11 flows toward the tunnel portion 25 behind the engine room 1, while keeping a relatively low temperature; and intrudes into the heat insulator 70, and the gap S between the heat insulator 70 and the tunnel portion 25.

On the other hand, the air W12 that has intruded into the cover member 60 through the slit 61a flows along the exhaust manifold 51 and the direct catalyst 52. The air W12 is introduced into the tunnel portion 25 behind the engine room 1 in a high temperature state by cooling the direct catalyst 52 (receiving heat from the direct catalyst 52).

Specifically, as illustrated in FIG. 2, on a same vertical cross section as the opening 62b of the lower cover 62, the high-temperature air W12 flowing along the direct catalyst 52 flows into the front heat insulator 71, while branching into air W13 that is released rearwardly and downwardly through a gap g1 between the rear portion 61b of the upper cover 61 and the rear portion 62a of the lower cover 62 (and along a wall surface of the flexible tube 54), and air W14 that is released rearwardly and downwardly through the opening portion 62b of the lower cover 62.

In this case, a part of the high-temperature air W12 flowing along the direct catalyst 52 (particularly, the air W13 released through the gap g1) may flow into the gap S between the heat insulator 70 and the tunnel portion 25. On the other hand, in the present embodiment, since the front end 71d of the rising portion 71c of the front heat insulator 71 is disposed on the upper side with respect to the rear end 61c of the upper cover 61, even when a part of the high-temperature air W12 flowing along the direct catalyst 52 tries to flow into the gap S, as indicated by the imaginary line W15 in FIG. 2, the air is needed to flow further on the upper side with respect to the front end 71d of the front heat insulator 71, which is located on the upper side with respect to the rear end 61c of the upper cover 61. In this way, in the present embodiment, since a so-called labyrinth structure in which an air flow passage is made complex is configured by the rear end 61c of the upper cover 61 and the front end 71d of the front heat insulator 71, it is possible to suppress high-temperature air from flowing into the gap S.

Consequently, since a temperature rise of the tunnel portion 25 by the high-temperature air W12 flowing along the direct catalyst 52 is suppressed, it is possible to suppress heat damage to the airbag control unit 8 disposed on a surface of the tunnel portion 25 on the vehicle interior side.

The air W11 of a relatively low temperature and flowing along the upper surface of the cover member 60 mainly flows into the gap S between the heat insulator 70 and the tunnel portion 25. Such an inflow of the low-temperature air W11 into the gap S also plays a role of suppressing the high-temperature airs W13 and 14 from flowing into the gap S.

As illustrated in FIG. 3, a cable accommodation recess portion 71e for receiving a change cable 9 is formed in the front heat insulator 71. The cable accommodation recess portion 71e extends forwardly from a front end of the body portion 71a, and is formed in such a way as to recess downwardly in a front view. The cable accommodation recess portion 71e is formed in such a way that a front end 71f of the cable accommodation recess portion 71e is located on the lower side with respect to the front end 71d of the rising portion 71c.

Figure 4:
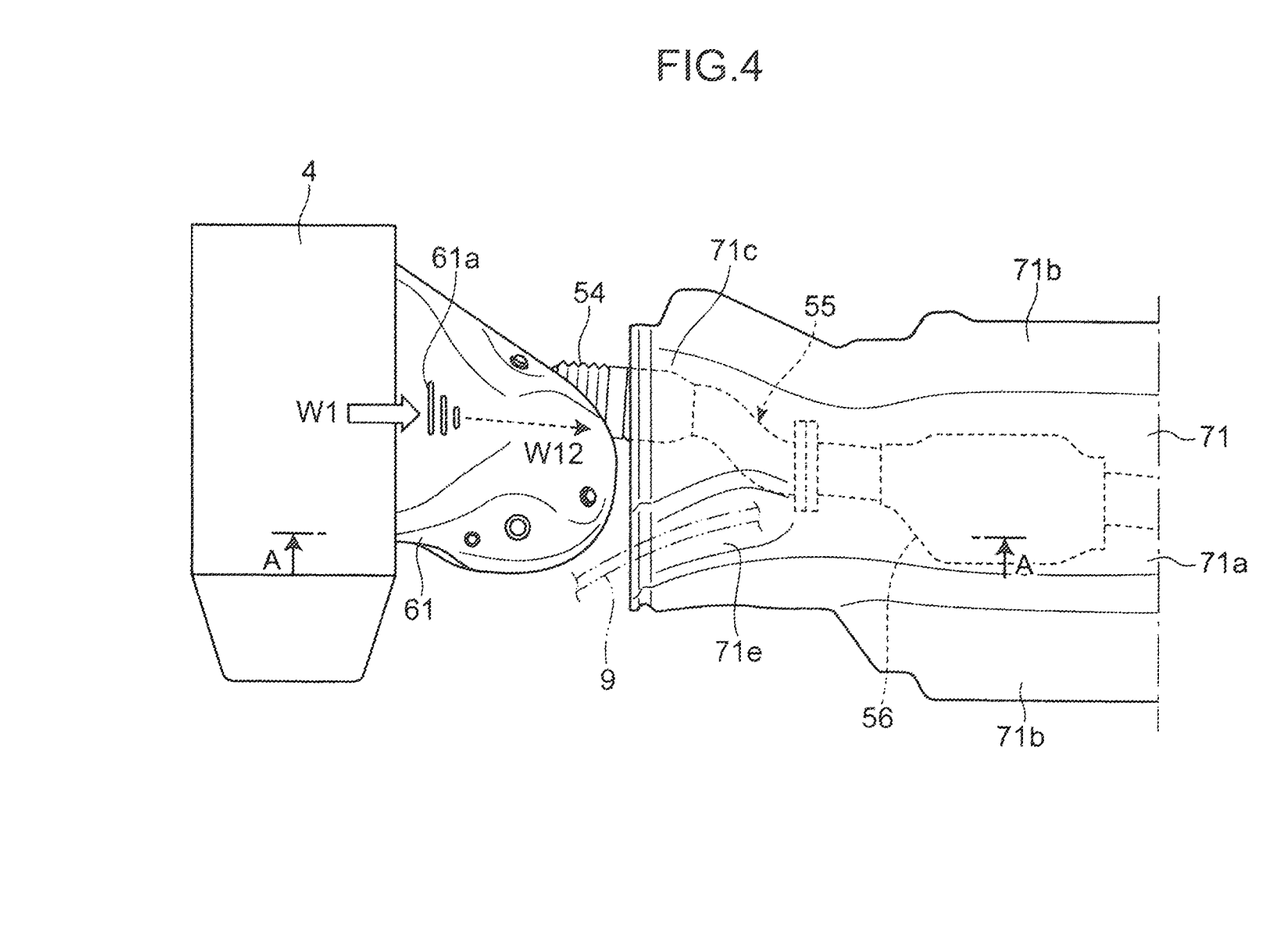
FIG. 4 is a plan view illustrating a positional relationship between a cover member and the heat insulator.

As illustrated in FIGS. 4 and 5, the opening portion 62b of the lower cover 62 and the front end 71f of the cable accommodation recess portion 71e are disposed in such a way as to offset from each other in the vehicle width direction.

As illustrated in FIG. 5, on a same vertical cross section as the cable accommodation recess portion 71e, the air W13 being a part of air which is heated to a high temperature by flowing along the direct catalyst 52 is released downwardly through a gap g1' between the rear portion 61b of the upper cover 61 and the rear portion 62a of the lower cover 62 (along the rear portion 61b of the upper cover 61) without being blocked by the flexible tube 54, and flows downwardly of the front heat insulator 71. In this way, on the same vertical cross section as the cable accommodation recess portion 71e, since high-temperature air released through the gap g1' of the cover member 60 basically flows downwardly (W13 in FIG. 5), basically, inflow of high-temperature air into the cable accommodation recess portion 71e is less likely to occur.

On the other hand, the high-temperature air W14 flowing along the direct catalyst 52 and released through the opening portion 62b of the lower cover 62 flows rearwardly and downwardly. However, in the present embodiment, the front end 71f of the cable accommodation recess portion 71e of the heat insulator 70 and the opening portion 62b of the lower cover 62 are disposed in such a way as to offset from each other in the vehicle width direction. Therefore, the high-temperature air W14 released through the opening portion 62b of the cover member 60 is also less likely to flow into the cable accommodation recess portion 71e. This contributes to suppressing high-temperature air from flowing into the gap S between the tunnel portion 25 and the heat insulator 70 via the cable accommodation recess portion 71e.

As described above, in the present embodiment, since a temperature rise of the tunnel portion 25 by the high-temperature air W12 flowing along the direct catalyst 52 is suppressed, it is possible to suppress heat damage to the airbag control unit 8 disposed on a surface of the tunnel portion 25 on the vehicle interior side.

The air W11 of a relatively low temperature that has flowed along the upper surface of the cover member 60 has a higher flow speed, as compared with the high-temperature air W12 flowing into the cover member 60, and is actively introduced into the gap S between the heat insulator 70 and the tunnel portion 25, as compared with the high-temperature air W12. Thus, the above configuration enables to more advantageously suppress the high-temperature airs W13 and W14 from flowing into the gap S.

Further, since the cable accommodation recess portion 71e of the heat insulator 70 and the opening portion 62b of the lower cover 62 are offset in the vehicle width direction, it is possible to dispose the change cable 9 to be disposed in the cable accommodation recess portion 71e, and the front exhaust pipe 53 and the flexible tube 54 passing through the opening portion 62b away from each other. Consequently, it is possible to suppress heat damage to the change cable 9 by the front exhaust pipe 53 and the flexible tube 54.

As illustrated in FIGS. 3 and 6, the body portion 71a of the front heat insulator 71 includes an opening portion 71g at a position associated with the support member 58 for supporting the exhaust pipe 50. Specifically, the support member 58 elastically supports the exhaust pipe body 55 with respect to the tunnel portion 25 through the opening portion 71g of the front heat insulator 71.

As illustrated in FIG. 3, a bead portion 71h is formed on a front end of the body portion 71a of the front heat insulator 71 in such a way as to expand outwardly along the shape of the body portion 71a. A projecting portion 71i projecting outwardly while surrounding the opening portion 71g is formed on the opening portion 71g.

As illustrated in FIG. 7, the bead portion 71h of the front heat insulator 71 is formed at a position associated with the tunnel reinforcement member 27 in the front-rear direction of the vehicle body. Thus, a gap S1 between a lower end 27a of the tunnel reinforcement member 27, and the bead portion 71h is made narrower than the gap S between the tunnel portion 25, and an intermediate portion of the front heat insulator 71. Specifically, a first gap narrowing portion b1 is formed by the tunnel reinforcement member 27 and the bead portion 71h.

A reference number 27a' (imaginary line) in FIG. 7 denotes a lower end of a conventional tunnel reinforcement member. As is clear form FIG. 7, the tunnel reinforcement member 27 according to the present embodiment is formed in such a way that a projection amount from an inner surface of the tunnel portion 25 is made larger than a projection amount of the conventional tunnel reinforcement member. Specifically, the gap S1 between the lower end 27a of the tunnel reinforcement member 27 and the bead portion 71h is made further narrower than a gap S1' between the lower end 27a' of the conventional reinforcement member and the bead portion 71h.

As illustrated in FIG. 6, the projecting portion 71i of the front heat insulator 71 is projected in such a way as to come close to a ceiling portion 25a and a lateral portion 25b of the tunnel portion 25. Thus, a gap S2 between the ceiling portion 25a and the lateral portion 25b of the tunnel portion 25, and the projecting portion 71i is made narrower than the gap S between the tunnel portion 25 and the intermediate portion of the front heat insulator 71. Specifically, a second gap narrowing portion b2 is formed by the projecting portion 71i and a part of the tunnel portion 25 (the ceiling portion 25a and the lateral portion 25b) that faces the projecting portion 71i.

As illustrated in FIG. 1, a front end of the rear heat insulator 72 is connected in such a way as to overlap the rear end of the front heat insulator 71 from above. Further, in the overlapping portion, a thickened portion 72a, which is thicker than the other part of the rear heat insulator 72, is formed on an outer surface of the rear heat insulator 72 by a thickening treatment, for example.

Thus, a gap S3 between the thickened portion 72a and the tunnel portion 25 is made narrower than the gap S between the tunnel portion 25, and the intermediate portion of the front heat insulator 71. Specifically, a third gap narrowing portion b3 is formed by the thickened portion 72a and a part of the tunnel portion 25 that faces the thickened portion 72a.

Further, a substantially closed space is formed between the tunnel portion 25 and the heat insulator 70 by the first, second, and third gap narrowing portions b1, b2, and b3.

Therefore, when the vehicle is stopped, for example, hot air released from the exhaust pipe 50, the exhaust manifold 51, the direct catalyst 52, the floor catalyst 56, and the like and flowing upwardly of the vehicle is suppressed from flowing into the gap S between the tunnel portion 25 and the heat insulator 70.

In this way, suppressing inflow of hot air enables to suppress a temperature rise of the tunnel portion 25, and suppress heat damage to a non-heat-resistant component such as the airbag control unit 8 disposed on the tunnel portion 25. Further, since flow of air itself is suppressed within a substantially closed space among the gap narrowing portions b1, b2, and b3, it is possible to more advantageously suppress heat transfer to the tunnel portion 25 and the interior of the passenger compartment 2.

In particular, since the first gap narrowing portion b1 is formed in a front end of the body portion 71a of the front heat insulator 71, intrusion of hot air released from the exhaust manifold 51, the direct catalyst 52, and the front exhaust pipe 53 disposed on the vehicle front side into the gap S between the tunnel portion 25 and the heat insulator 70 is advantageously suppressed.

Further, since the second gap narrowing portion b2 is formed in such a way as to surround the opening portion 71g of the front heat insulator 71, intrusion of hot air released from the exhaust pipe body 55, the floor catalyst 56 and the like disposed below the front heat insulator 71 into the gap S between the tunnel portion 25 and the heat insulator 70 through the opening portion 71g of the front heat insulator 71 is suppressed.

Consequently, a temperature rise of the tunnel portion 25 is more advantageously suppressed, and the above advantageous effect of suppressing heat damage to a non-heat-resistant component such as the airbag control unit 8 is further enhanced.

Further, since the first gap narrowing portion b1 is formed by using the bead portion 71h of the front heat insulator 71 and the tunnel reinforcement member 27, it is possible to systematically form a gap narrowing portion, without the need of adding another component in order to narrow the gap between the tunnel portion 25 and the heat insulator 70.

Since the second gap narrowing portion b2 is formed by using the projecting portion 71i formed by projecting only a periphery of the opening portion 71g of the front heat insulator 71, it is possible to form a gap narrowing portion, while suppressing an increase in weight of the heat insulator 70.

Since the third gap narrowing portion b3 is formed by using the thickened portion 72a, which is limitedly formed on a part of the rear heat insulator 72 that overlaps the front heat insulator 71, it is possible to form a gap narrowing portion, while suppressing an increase in the weight of the heat insulator 70.

Figure 8:
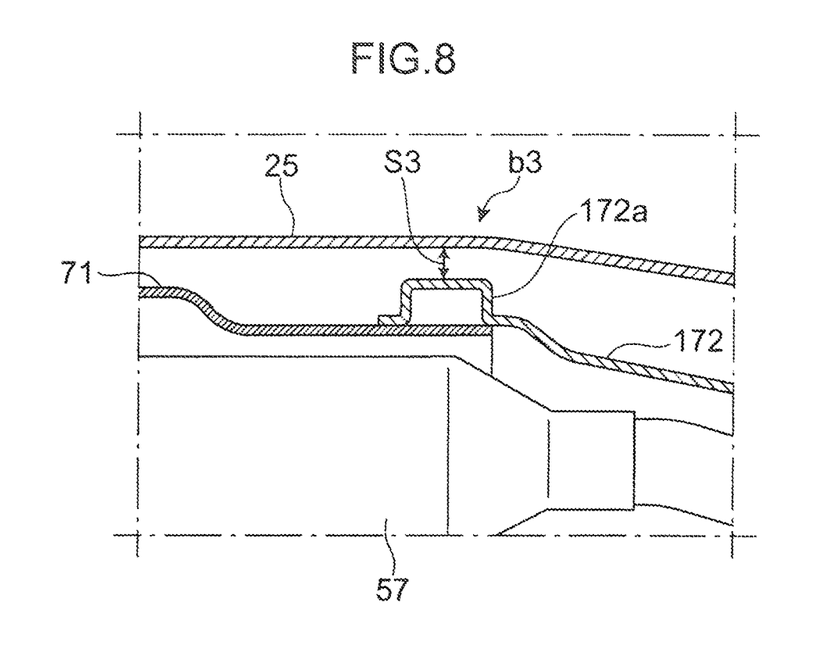
FIG. 8 is a cross-sectional view illustrating a modification of the embodiment.

Alternatively, in order to form the third gap narrowing portion b3, a bead portion may be formed on the rear heat insulator 72, in place of the thickened portion 72a. Specifically, as illustrated in FIG. 8, a bead portion 172a may be formed on a part of a rear heat insulator 172 that overlaps the front heat insulator 71 in such a way as to expand outwardly along the shape of the rear heat insulator 172.

Thus, it is possible to narrow the gap between the tunnel portion 25 and the rear heat insulator 172, thereby providing the above advantageous effect. Further, the above configuration enables to further suppress an increase in weight, as compared with a case that the thickened portion 72a is formed.

Overview of Embodiment

The following is an overview of the embodiment.

A vehicle underbody structure according to the embodiment includes: a catalyst disposed in a front portion of an exhaust pipe; a cover member for covering the catalyst from above; and a heat insulator disposed inside a tunnel portion extending in a front-rear direction of a vehicle body at a position behind the catalyst, the heat insulator extending along the tunnel portion and configured to cover the exhaust pipe from above. The heat insulator is disposed away from the tunnel portion by a predetermined gap in an up-down direction. A front portion of the heat insulator and a rear portion of the cover member are disposed in such a way as to overlap each other. A front end of the heat insulator is disposed on an upper side with respect to the rear end of the cover member.

In the vehicle underbody structure, since the front end of the heat insulator for covering the exhaust pipe from above inside the tunnel portion is disposed on the upper side with respect to the rear end of the cover member for covering the catalyst disposed on the front side with respect to the tunnel portion from above, it is possible to suppress air, which is heated to a high temperature by an influence of the catalyst, from being introduced into the gap between the tunnel portion and the heat insulator.

Specifically, a part of air flowing from the vehicle front side to the tunnel portion is brought to a high temperature state by flowing along the catalyst inside the cover member for covering the catalyst, and is released rearwardly from the rear end of the cover member. In this case, a part of the high-temperature air released from the cover member may flow into the gap between the tunnel portion and the heat insulator. On the other hand, in the above structure, since the front end of the heat insulator is disposed on the upper side with respect to the rear end of the cover member, air trying to flow into the gap is needed to flow further on the upper side with respect to the front end of the heat insulator, which is located on the upper side with respect to the rear end of the cover member. In this way, in the above structure, since a so-called labyrinth structure in which an air flow passage is made complex is configured by the rear end of the cover member and the front end of the heat insulator, it is possible to suppress high-temperature air from flowing into the gap.

Consequently, a temperature rise of the tunnel portion by high-temperature air flowing along the catalyst is suppressed. Thus, it is possible to suppress heat damage to a non-heat-resistant component, even when the non-heat resistant component is disposed on a surface of the tunnel portion on the vehicle interior side, for example.

The air flowing from the vehicle front side along an upper surface of the cover member flows into the tunnel portion, while keeping a relatively low temperature, as compared with high-temperature air flowing along the catalyst. In this way, introducing relatively low temperature air into the gap between the tunnel portion and the heat insulator also enables to suppress the above phenomenon that high-temperature air flows into the gap, and suppress heat damage to the non-heat-resistant component disposed on the tunnel portion.

Preferably, an opening portion for receiving the exhaust pipe may be formed in the rear portion of the cover member. A cable accommodation recess portion recessed downwardly in a front view for receiving a cable may be formed in the front portion of the heat insulator. The opening portion of the cover member and a front end of the cable accommodation recess portion may be disposed in such a way as to offset in a vehicle width direction.

In the above configuration, since the opening portion of the cover member and the front end of the cable accommodation recess portion are offset in the vehicle width direction, it is possible to suppress high-temperature air flowing along the catalyst and released through the opening portion of the cover member from flowing into the cable accommodation recess portion.

Further, since the exhaust pipe passing through the opening portion of the cover member, and a cable disposed inside the cable accommodation recess portion are disposed away from each other by the above-described offset arrangement, it is possible to suppress heat damage to the cable from the exhaust pipe.

Preferably, a gap between the front portion of the heat insulator and the tunnel portion may be set smaller than a gap between an intermediate portion of the heat insulator and the tunnel portion.

In this way, when the gap between the tunnel portion and the heat insulator is set relatively small in a front portion, even when hot air from the catalyst, the exhaust pipe, and the like flows upwardly when the vehicle is stopped, for example, it is possible to suppress the hot air from intruding into the gap between the tunnel portion and the heat insulator.

Thus, since a temperature rise of the tunnel portion is suppressed also when the vehicle is stopped, for example, the above configuration more advantageously enables to suppress heat damage to the non-heat-resistant component disposed on the tunnel portion.

INDUSTRIAL APPLICABILITY

As described above, the present invention is advantageously applied to an industrial field of manufacturing vehicle bodies of vehicles including a heat insulator disposed along an inner surface of a tunnel portion.

The invention claimed is:

1. A vehicle underbody structure comprising:
a catalyst disposed in a front portion of an exhaust pipe;
a cover member for covering the catalyst; and
a heat insulator disposed inside a tunnel portion extending in a front-rear direction of a vehicle body at a position behind the catalyst, the heat insulator extending along the tunnel portion and configured to cover the exhaust pipe from above, wherein the cover member includes an upper cover for covering the catalyst from above, the heat insulator is disposed away from the tunnel portion by a predetermined gap in an up-down direction at a position behind the upper cover, a front portion of the heat insulator and a rear portion of the upper cover are disposed in such a way as to overlap each other when viewed in the front-rear direction of the vehicle body, and a front end of the heat insulator is disposed on an upper side with respect to a rear end of the upper cover.

2. The vehicle underbody structure according to claim 1, wherein an opening portion for receiving the exhaust pipe is formed in the rear portion of the cover member, a cable accommodation recess portion recessed downwardly in a front view for receiving a cable is formed in the front portion of the heat insulator, and the opening portion of the cover member and a front end of the cable accommodation recess portion are disposed in such a way as to offset in a vehicle width direction.

3. The vehicle underbody structure according to claim 1, wherein a gap between the front portion of the heat insulator and the tunnel portion is set smaller than a gap between an intermediate portion of the heat insulator and the tunnel portion.

4. The vehicle underbody structure according to claim 1, wherein the upper cover includes a splitting portion for branching air flowing from a front side of the vehicle body into air flowing rearwardly along an upper surface of the upper cover toward the tunnel portion, and air intruding into the cover member and flowing rearwardly through an area below the upper cover.

5. The vehicle underbody structure according to claim 4, wherein the splitting portion includes a slit formed in the upper cover.

6. The vehicle underbody structure according to claim 1, wherein the rear portion of the upper cover is formed to extend rearwardly and downwardly from a rear end of a front portion of the upper cover.

7. The vehicle underbody structure according to claim 6, wherein the cover member further includes a lower cover for covering the catalyst from below, and the rear end of the upper cover extends downwardly to a position where the rear end covers a part of an upper portion of a rear portion of the lower cover from behind.

* * * * *